US012624215B2

(12) United States Patent
Erokh et al.

(10) Patent No.: US 12,624,215 B2
(45) Date of Patent: May 12, 2026

(54) CATIONIC DYES AND USES THEREOF

(71) Applicant: EVER DYE, Bry-sur-Marne (FR)

(72) Inventors: Amira Erokh, Evry-Courcouronnes (FR); Cleverton Pirih, Evry-Courcouronnes (FR); Elsa Tufenkjian, Evry-Courcouronnes (FR)

(73) Assignee: Ever Dye, Bry-sur-Marne (FR)

( * ) Notice: Subject to any disclaimer, the term of this patent is extended or adjusted under 35 U.S.C. 154(b) by 0 days.

(21) Appl. No.: 18/727,388

(22) PCT Filed: Jan. 11, 2023

(86) PCT No.: PCT/EP2023/050579
§ 371 (c)(1),
(2) Date: Jul. 9, 2024

(87) PCT Pub. No.: WO2023/135184
PCT Pub. Date: Jul. 20, 2023

(65) Prior Publication Data
US 2025/0122379 A1     Apr. 17, 2025

(30) Foreign Application Priority Data

Jan. 12, 2022     (EP) ..................................... 22305027

(51) Int. Cl.
| | |
|---|---|
| *C09B 69/00* | (2006.01) |
| *C08B 15/00* | (2006.01) |
| *C09B 69/10* | (2006.01) |
| *D06P 1/42* | (2006.01) |
| *D06P 5/20* | (2006.01) |
| *D06P 5/22* | (2006.01) |
| *D06P 3/04* | (2006.01) |

(Continued)

(52) U.S. Cl.
CPC ............ *C09B 69/109* (2013.01); *C08B 15/00* (2013.01); *D06P 1/42* (2013.01); *D06P 5/2066* (2013.01); *D06P 5/22* (2013.01); *D06P 3/041* (2013.01); *D06P 3/522* (2013.01); *D06P 3/6016* (2013.01)

(58) Field of Classification Search
CPC ....... C09B 69/109; C08B 15/00; C08B 15/04; C08B 15/06; C08B 69/001; D06P 1/42; D06P 5/2066; D06P 5/22; D06P 3/041; D06P 3/522; D06P 3/6016; D06P 1/50; D06P 3/002; C08L 1/04; C08L 1/08
USPC ........................................... 8/539
See application file for complete search history.

(56) References Cited

U.S. PATENT DOCUMENTS

| | | | |
|---|---|---|---|
| 9,506,187 B2 | 11/2016 | Minko | |
| 2013/0211308 A1 | 8/2013 | Wan | |
| 2016/0010275 A1* | 1/2016 | Minko | ...................... D06P 1/50 |
| | | | 8/445 |

FOREIGN PATENT DOCUMENTS

| | | | | |
|---|---|---|---|---|
| CN | 105 080 503 A | | 11/2015 | |
| CN | 113651894 A | * | 11/2021 | ............. C08B 15/06 |
| CN | 113914124 A | * | 1/2022 | ............. D21B 1/345 |

OTHER PUBLICATIONS

Amino-functionalized nanocrystalline cellulose as an adsorbent for anionic dyes dated May 10, 2015.*

(Continued)

*Primary Examiner* — Eisa B Elhilo
(74) *Attorney, Agent, or Firm* — Mueting Raasch Group

(57) ABSTRACT

The present invention relates to new nanocellulose-based cationic dyes, to a process for their synthesis, and to their use in processes for dyeing fibers, such as textile fibers.

16 Claims, 2 Drawing Sheets

(51) Int. Cl.
| | |
|---|---|
| *D06P 3/52* | (2006.01) |
| *D06P 3/60* | (2006.01) |

(56) References Cited

OTHER PUBLICATIONS

Liyanapathiranage et al.: "Nanocellulose-based sustainable dyeing of cotton textiles with minimized water pollution", *ACS Omega*, vol. 5, No. 16, 2020, pp. 9196-9203.

Jin, "Amino-functionalized nanocrystalline cellulose as an adsorbent for anionic dyes", *Cellulose*, vol. 22, No. 4, May 10, 2015 (May 10, 2015), Netherlands, pp. 2443-2456.

Guardia "Tuning the Size, the Shape, and the Magnetic Properties of Iron Oxide Nanoparticles", *J. Phys. Chem. C* 2011, vol. 115, No. 2, Dec. 13, 2010 (Dec. 13, 2010), pp. 390 396.

Wang, "One-pot reaction to synthesize superparamagnetic iron oxide nanoparticles by adding phenol as reducing agent and stabilizer", *J Nanopart Res*, vol. 14, No. 755, Mar. 6, 2012 (Mar. 6, 2012), 7 pages.

Rajendran, "Synthesis and Characterization of Zinc Oxide and Iron Oxide Naoparticles Using *Sesbania grandiflora* Leaf Extract as Reducing Agent", *Journal of Nanoscience*, vol. 2017, Jan. 3, 2017 (Jan. 3, 2017), pp. 7.

Smriti et al.: "Environment-friendly nanocellulose-indigo dyeing of textiles", *Green Chem*, vol. 23, Jul. 17, 2021, 17 pages.

International Patent Application No. PCT/EP2023/050579, filed Jan. 11, 2023, International Search Report and Written Opinion issued Mar. 29, 2023, 13 pages.

Harane Rachana S. et al: "Sustainable processes for pre-treatment of cotton fabric", Textiles and Clothing Sustainability, vol. 2, No. 1, Mar. 11, 2016 (Mar. 11, 2016), XP093033208, Retrieved from the Internet <URL:http://link.springer.com/article/10.1186/s40689-016-0012-7/fulltext.html> DOI: 10.1186/s40689-016-0012-7 *.

Jin Liqiang et al: "Amino-functionalized nanocrystalline cellulose as an adsorbent for anionic dyes", vol. 22, No. 4, May 10, 2015 (May 10, 2015), Netherlands, pp. 2443-2456, XP055928891, ISSN: 0969-0239, Retrieved from the Internet <URL:http://link.springer.com/article/10.1007/s10570-015-0649-4/fulltext.html> DOI: 10.1007/s10570-015-0649-4 *.

Korica Matea et al: "Influence of Different Pretreatments on the Antibacterial Properties of Chitosan Functionalized Viscose Fabric: TEMPO Oxidation and Coating with TEMPO Oxidized Cellulose Nanofibrils", *Materials*, vol. 12, No. 19, Sep. 26, 2019 (Sep. 26, 2019), pp. 3144, XP055928493, DOI: 10.3390/ma12193144 *.

Xu Qinghua et al: "Enhancing Removal of Cr(VI), Pb2+, and Cu2+ from Aqueous Solutions Using Amino-Functionalized Cellulose Nanocrystal", *Molecules*, vol. 26, No. 23, Dec. 2, 2021 (Dec. 2, 2021), pp. 7315, XP055928413, DOI: 10.3390/molecules 26237315 *.

* cited by examiner

CATIONIC DYES AND USES THEREOF

This application is the § 371 U.S. National Stage of International Application No. PCT/EP2023/050579, filed 11 Jan. 2023, which claims the priority to European App. No. EP22305027.9, filed 12 Jan. 2022.

FIELD OF INVENTION

The present invention relates to new nanocellulose-based cationic dyes, to a process for their synthesis, and to their use in processes for dyeing fibers, in particular textile fibers.

BACKGROUND OF INVENTION

The growth of human population and the current way of life have created an increasing demand for the consumption of clothing, amplifying the needs of textile dyeing.

Textile dyeing processes are generally energy-consuming, requiring long reaction times and/or the use of high temperatures, and create massive and often toxic effluents.

Dyeing of cotton fibers has been mainly performed over the past decades with reactive dyes, because such dyes are cost-effective and produce a wide range of colors. These dyes typically comprise aromatic chromophores and amine auxochromes, which give the color properties of the dye. They further comprise reactive groups, such as chlorine leaving groups, which afford linking the dye to the fabric surface via covalent bonds. Reactive dyes offer a very strong dye-textile fixation and excellent dyeing properties. However, chlorine ions are released during the chemical reaction, resulting in chloride-containing wastewater and colored sewage. In addition, reactive dyeing requires high thermal energy and pretreatment with salt saturated solutions to suppress the repulsive forces between the negatively charged dye molecules and cotton fibers. Electrolytes, such as sodium chloride, sodium carbonate and sodium sulphate, are added to the dyeing bath to improve the interactions between the dye and the fabric. Electrolyte concentrations are increased gradually to promote dye exhaustion which produce highly concentrated wastewater with a COD value equal to 50,000 ppm.

Mordant dyes may also be used for dyeing cotton fibers. Natural dyes, also referred to as direct dyes, are derived from natural sources as animals and plants, hence they are more environmentally friendly than reactive dyes. However, they do not form strong covalent bond with cotton surfaces. They bind to the cellulosic fiber via electrostatic bonds, weak Van der Waals forces and/or hydrogen bonds. To increase the affinity of natural dyes, metal mordants are used as a dyeing pretreatment. Mordants bind to the fabric and to the dye by strong coordination bonds, thus fixing the dye molecules to the fabric surface. Previously, toxic chromium, iodine, cobalt and/or nickel complexes were used as mordants. Recently, metals with lower toxicity such as copper, iron, and aluminum are adopted as a greener pretreatment product. However, the problem of excessive metals concentration in wastewater and the enormous volume of water needed persists. Natural bio-mordants could also be used as a green replacement for metal mordants. For example, whey protein, a mixture of three proteins of bovine serum albumin, was used to improve the affinity of pomegranate natural dye toward cotton via hydrogen bonds and to decrease negative charges repulsive forces between fabric and dye molecules. Unfortunately, such products are not widely used in industry because of their cost of production.

A few processes aiming at reducing the environmental impact of cotton fiber dyeing processes have been developed in the recent years.

Anuradhi Liyanapathiranage et al. "Nanocellulose-based sustainable dyeing of cotton textiles with minimized water pollution" *ACS Omega* 2020, 5, 16, p. 9196-9203 disclose a dyeing process of cotton fibers using reactive dyes incorporated onto pristine nanocellulose fibers containing hemicellulose. The dying process is performed at 60° C. for 90 min, and a salt is used to create an affinity between the dye and the fiber. To further improve the fixation and lower the hydrophilic character, a post-treatment with polycarboxylic acids such as citric acid or maleic acid is performed, implying a soaking of the fabric in the solution and a drying step at a high temperature of 120° C.

Smriti et al. "Environment-friendly nanocellulose-indigo dyeing of textiles" *Green Chem.* 2021, 23, p. 7937 disclose a dyeing process of cotton fibers involving a dye comprising natural indigo incorporated on nanocellulose fibers. The nanocellulose fibers dispersion is mixed with agglomerated indigo and a surfactant, Triton® X-100. The obtained suspension is mixed with cotton fibers, and a drying step is performed at 120° C. In order for the dyeing to resist washing of the cotton fabrics, a post-treatment involving chitosan solution adsorption is necessary. Said post-treatment is performed by soaking the dyed cotton fabrics with chitosan for 15 minutes, followed by a drying step performed at 120° C.

CN113914124 discloses a modified nanocellulose and its use for the preparation of base paper with improved mechanical properties. The modified nanocellulose is compounded with titanium dioxide and can be used as addition product to the base paper pulp.

CN105080503 discloses a nanocellulose polyvinylamine microgel and its use for absorbing dyestuff material in waste water, especially anionic dyes and heavy metal ions. The nanocellulose polyvinylamine microgel is not simultaneously cationic and colored: When the dispersion medium is acidic, the amine moiety is chelated to the anionic dyes, resulting in a material which is not cationic. When the dispersion medium is neutral or basic, the amine moiety is not cationic.

US2013/0211308 discloses nanosilver coated nanocellulose and its use for the manufacture of medical devices or antibacterial clothes. The material results from oxidation of nanocellulose to form aldehyde functions, followed by a Shiff reaction of an amine group with the aldehydes. The resulting material is not cationic Document Cellulose (2015) 22:2443-2456 discloses amino functionalized nanocrystalline cellulose (ANCC) as an adsorbent for anionic dyes in waste water treatment. ANCC is not simultaneously cationic and colored.

Document Molecules, 2021, 26, 7315 discloses amino functionalized nanocrystalline cellulose and its use for the adsorption and removal of cations and anions from wastewater. The amino functionalized nanocrystalline cellulose is not simultaneously cationic and colored.

U.S. Pat. No. 9,506,187 discloses a method for dyeing textiles using a dyed nanocellulose dispersion. The nanocellulose bears no cationic moieties, only colored moieties. The dyeing method requires heating the dying bath to 80° C. and uses salts.

The document Materials, 2019, 12, 3144 discloses functionalization of cellulose nanofibrils with chitosan. Carboxyl and aldehyde groups are introduced on viscose backbone by an oxidation treatment based on TEMPO. The resulting textiles show antibacterial properties with improved resistance to washing cycles.

There thus remains a need for the development of new dyes, which would be suitable for implementing efficient dyeing processes of fibers, for instance textile fibers, such as cotton fibers, allowing an efficient fixation of the dye to the fibers, preferably without the need of a post-treatment, requiring as low energy consumption as possible, for instance by using only low temperatures, and limiting the production of effluents both in terms of volume and of toxicity, so as to limit the necessary retreatment of effluents.

The Applicant surprisingly evidenced that the use of a very specific dye comprising both a colored moiety and a cationic moiety linked to specific positions on the glycosidic rings of nanocellulose allows a very efficient dyeing of fibers, such as textile fibers. The dyeing processes using said dye afford among other advantages an improved fastness of the color, a reduced dyeing time and/or a reduced energy-consumption.

SUMMARY

This invention thus relates to a cationic dye comprising:
nanocellulose,
at least one cationic moiety covalently linked to the nanocellulose, and
at least one colored moiety linked to the nanocellulose.

In favorite embodiments, the cationic moiety and the colored moiety are linked to distinct carbon atoms of the nanocellulose backbone.

In some embodiments, the cationic moiety is covalently linked to nanocellulose in C2 and/or C3 position(s) of at least one glucose moiety of said nanocellulose.

In some embodiments, the colored moiety is linked with ionic and/or hydrogen bonds to nanocellulose in C6 position of at least one glucose moiety of said nanocellulose.

In some embodiments, the nanocellulose is selected from the group consisting of cellulose nanofibers, cellulose nanocrystals and any mixture thereof, preferably the nano-cellulose is cellulose nanocrystals.

In some embodiments, the at least one cationic moiety comprises a quaternized amine group, preferably a quaternized primary amine group.

In some embodiments, the at least one cationic moiety is selected from the group consisting of a quaternized diamine moiety, a quaternized amino acid, a quaternized peptide and a quaternized protein.

In some embodiments, the colored moiety is a colored mineral moiety.

In some embodiments, the colored moiety is a metal or a metal oxide.

In some embodiments, the colored mineral moiety is iron oxide.

In preferred embodiments of the method for the synthesis of the cationic dye, the colored moiety is introduced as a precursor In preferred embodiments, at least one cationic moiety and at least one colored organic or mineral moiety are different moieties in the cationic dye.

The invention further relates to a process for the synthesis of the cationic dye according to the invention, comprising the following steps:
(i) Contacting optionally modified nanocellulose with a colored moiety, or a precursor thereof, and
(ii) Contacting optionally modified nanocellulose with a cationic moiety, to obtain a cationic dye.

The invention further relates to a process for the synthesis of the cationic dye according to the invention, comprising the following steps:
(i) Contacting optionally modified nanocellulose with a colored moiety, or a precursor thereof, to obtain a partially functionalized nanocellulose, and
(ii) Contacting the optionally further modified partially functionalized nanocellulose obtained at step (i) with a cationic moiety, to obtain a cationic dye according to the invention.

In an embodiment, the method for the synthesis of the cationic dye comprises a step of oxidizing at least part of the OH groups of optionally modified nanocellulose into alde-hyde moieties.

In a favorite embodiment of the method for the synthesis of the cationic dye, $NaIO_4$ is used for oxidizing at least part of the OH groups of optionally modified nanocellulose into aldehyde moieties.

The invention further relates to a process for dyeing at least part of a fiber material, comprising the steps of:
a) contacting at least part of the fiber material with a pretreatment agent, preferably selected from the group consisting of an oxidant and a hydrolyzing agent, so as to obtain a pretreated fiber material, and
b) contacting the pretreated fiber material obtained at step a) with at least one cationic dye according to the invention, to obtain a dyed fiber material.

In some embodiments, the fiber material is a textile fiber material.

In some embodiments, the textile fiber material is selected from the group consisting of a cotton fiber material, a polyester fiber material, a keratinic fiber material and a mixture thereof.

In some favorite embodiments, the dyeing step is imple-mented at a temperature of 20° C. to 50° C., more preferably from 20° C. to 30° C.

In some favorite embodiments, the dyeing step is imple-mented in the absence of salts.

In some embodiments, the oxidant is selected from the group consisting of TEMPO, TEMPO in presence of iron, potassium hydrogenopersulfate, hydrogen peroxide, hydro-gen peroxide in presence of iron (preferably an iron cation), and sodium metabisulfite.

In some embodiments, the process for dyeing at least part of a fiber material further comprises, after step b), a step of:
c) drying the dyed fiber material obtained at step b) at a temperature lower than 100° C.

Definitions

In the present invention, the following terms have the following meanings:

"About", before a figure or number, refers to plus or minus 10%, preferably plus or minus 5%, more preferably plus or minus 1%, of the face value of that figure or number.

A "cationic moiety" is a moiety bearing at least one positive charge in the experimental conditions to which the cationic moiety is submitted, preferably in the experimental conditions used for the dyeing process.

A "cationic dye" is a dye bearing at least one positive charge in the experimental conditions to which the cationic dye is submitted, preferably in the experimental conditions used for the dyeing process.

"Cellulose nanocrystals", also referred to as CNC, are crystalline nanostructures substantially consisting of cellu-lose molecules. CNC exhibit elongated crystalline rod-like shapes with a very limited flexibility compared to cellulose nanofibers as they do not contain amorphous regions. CNC are also known as nanowhiskers, nanorods, and rod-like cellulose crystals. They are usually isolated from cellulose fibers through acid hydrolysis. CNC possess a relatively low aspect ratio; they present a typical diameter of 2-20 nm and wide length distribution from 100 to 600 nm.

"Cellulose nanofibers", also referred to as CNF, are nanoscale fibers substantially consisting of cellulose molecules. CNF have a diameter of about 3 nm and lengths in the micron scale and show both crystalline and amorphous sections. CNF may be prepared by means of TEMPO ((2,2,6,6-tetramethylpiperidin-1-yl)oxy)-mediated oxidation of cellulose, followed by mechanical treatment with a homogenizer.

A "colored moiety" is a moiety that is colored by itself, and/or that imparts color to the dye when it is bound to the nanocellulose. The colored moiety is preferably bound to the nanocellulose via ionic and/or hydrogen bonds. The colored moiety comprised in the dye according to the invention may be obtained through the binding of a precursor thereof, such as $Fe^{2+}$, to the nanocellulose, and then the formation of the colored moiety, preferably iron oxide, in-situ from the precursor.

"Covalent", when used to qualify a bond or a fixation, refers to the characteristic of a bond between two atoms resulting from the pooling of electrons coming separately from each of them. According to the present invention, a covalent binding of two moieties may be a binding of said two moieties through a linker moiety, that is covalently bound to each moiety. A linker moiety may be an atom or a chain of covalently linked atoms.

A "dye" refers to a natural or synthetic substance used to add a color to or change the color of a fiber material, in particular a textile fiber material.

A "fiber material" is a material that comprises or consists of at least one type of fibers. The fiber material may be a material comprising or consisting of yarns, the yarns themselves comprising or consisting of fibers. Preferably, the fiber material comprising or consisting of fibers is a textile fiber material. The term "textile fibers" includes any fibers that may be used in the textile area, especially any fibers that may be dyed and used in the textile area. In some embodiments, the fiber material comprises only one type of fibers. In other embodiments, the fiber material comprises fibers of at least two different types.

"From X to Y" refers to the range of values between X and Y, the limits X and Y being included in said range.

A "mineral" moiety is an atom or a group of atoms which does not comprise any carbon atom.

"Nanocellulose": refers to a nanostructure of cellulose. Nanocellulose exists in particular in three forms: cellulose nanofibers (CNF), cellulose nanofibrils and cellulose nanocrystals (CNC).

An "organic" moiety is a group of covalently linked atoms, comprising at least one carbon atom.

A "pretreatment agent" is a chemical agent that is contacted with at least part of a fiber material to be dyed before said fiber material is contacted with the dye. In specific cases, the contacting with the pretreatment agent and with the dye may be performed simultaneously. Contacting the fiber material with the pretreatment agent in suitable conditions confers said fiber material interesting properties in view of its further dyeing. For instance, contacting the fiber material with the pretreatment agent in suitable conditions may create chemical moieties at the surface of the fiber material, said chemical moieties allowing increasing the efficacy and/or lowering the duration of the further dyeing step.

"Quaternized", when referring to a chemical moiety comprising an amine moiety, means that the amine nitrogen atom is bound to 4 different atoms, and thus bears a positive charge.

DETAILED DESCRIPTION

Cationic Dye

A first object of this invention is a cationic dye comprising:
nanocellulose,
at least one cationic moiety covalently linked to the nanocellulose, and
at least one colored moiety linked to the nanocellulose.
Nanocellulose The nanocellulose comprised in the cationic dye according to the invention may be any nanostructure of cellulose. In some embodiments, the nanocellulose comprised in the cationic dye according to the invention is selected from the group consisting of cellulose nanofibers (CNF), cellulose nanofibrils and cellulose nanocrystals (CNC). In preferred embodiments, the nanocellulose comprised in the cationic dye according to the invention is selected from the group consisting of cellulose nanofibers (CNF) and cellulose nanocrystals (CNC). In more preferred embodiments, the nanocellulose comprised in the cationic dye according to the invention is cellulose nanocrystals (CNC).

Without wishing to be bound by any theory, the Inventors believe that the use of CNC as nanocellulose comprised in the cationic dye according to the invention allows a better penetration of the dye in the fibers because their size is smaller than that of CNF.

Typically, the CNC comprised in the cationic dye according to the invention have a length ranging from 100 nm to 600 nm, preferably ranging from 100 nm to 300 nm. Typically, the CNC comprised in the cationic dye according to the invention have a diameter ranging from 2 to 20 nm, preferably ranging from 2 to 5 nm.

Nanocellulose is a homopolymer formed of a linear chain of D-glucose moieties. Each glycosidic ring of cellulose comprises three hydroxyl OH groups in positions C2, C3 and C6. The numbering of the positions on the glycosidic rings is as shown on the formula below:

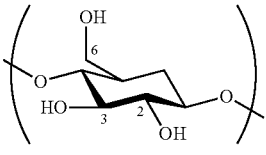

Cationic Moiety

The cationic moiety comprised in the cationic dye according to the invention may be any chemical moiety that bears at least one positive charge, preferably exactly one positive charge. In some embodiments, the cationic moiety comprises more than one positive charge, for instance it comprises from 2 to 10 positive charges, in particular it comprises 2, 3, 4, 5, 6, 7, 8, 9 or 10 positive charges. The presence of more than one positive charge on the cationic moiety may improve the binding of the cationic dye to the fiber material. The cationic moiety preferably is covalently linked to at least one OH group in C2 or C3 position of a glycosidic ring of the nanocellulose comprised in the cationic dye according to the invention.

In some embodiments, all the OH groups in C2 position of the glycosidic rings of the nanocellulose comprised in the cationic dye according to the invention are substituted with a cationic moiety.

In other embodiments, at least 20%, at least 30%, at least 40%, at least 50%, at least 60%, at least 70%, at least 80% or at least 90% of the OH groups in C2 position of the glycosidic rings of the nanocellulose comprised in the cationic dye according to the invention are substituted with a cationic moiety.

In some embodiments, from 10% to 90%, preferably from 20% to 80%, more preferably from 30% to 70%, even more preferably from 40% to 60%, in particular about 50% of the OH groups in C2 position of the glycosidic rings of the nanocellulose comprised in the cationic dye according to the invention are substituted with a cationic moiety. The proportion of OH groups in C2 position of the glycosidic rings of the nanocellulose comprised in the cationic dye according to the invention that are substituted with a cationic moiety may vary in a wide range depending, among others, on the structure and the steric hindrance of the cationic moiety.

In some embodiments, all the OH groups in C3 position of the glycosidic rings of the nanocellulose comprised in the cationic dye according to the invention are substituted with a cationic moiety.

In other embodiments, at least 20%, at least 30%, at least 40%, at least 50%, at least 60%, at least 70%, at least 80% or at least 90% of the OH groups in C3 position of the glycosidic rings of the nanocellulose comprised in the cationic dye according to the invention are substituted with a cationic moiety.

In some embodiments, from 10% to 90%, preferably from 20% to 80%, more preferably from 30% to 70%, even more preferably from 40% to 60%, in particular about 50% of the OH groups in C3 position of the glycosidic rings of the nanocellulose comprised in the cationic dye according to the invention are substituted with a cationic moiety. The proportion of OH groups in C3 position of the glycosidic rings of the nanocellulose comprised in the cationic dye according to the invention that are substituted with a cationic moiety may vary in a wide range depending, among others, on the structure and the steric hindrance of the cationic moiety.

The cationic moiety may be any moiety comprising at least one positive charge in the experimental conditions. In some embodiments, the cationic moiety comprises a positively charged nitrogen or phosphorus atom in its structure. In some embodiments, the cationic moiety comprises a quaternary ammonium or a quaternized amine in its structure.

In some embodiments, the cationic moiety is selected from the group consisting of a quaternized diamine moiety, a quaternized amino acid, a quaternized peptide and a quaternized protein.

Colored Moiety

The colored organic or mineral moiety may be any organic or mineral moiety that is colored per se, and/or that is colored once fixed to the nanocellulose of the cationic dye according to the invention. The colored moiety is preferably linked to at least one OH group in C6 position of a glycosidic ring of the nanocellulose comprised in the cationic dye according to the invention.

In some embodiments, all the OH groups in C6 position of the glycosidic rings of the nanocellulose comprised in the cationic dye according to the invention are substituted with a colored moiety.

In other embodiments, at least 20%, at least 30%, at least 40%, at least 50%, at least 60%, at least 70%, at least 80% or at least 90% of the OH groups in C6 position of the glycosidic rings of the nanocellulose comprised in the cationic dye according to the invention are substituted with a colored moiety.

In some embodiments, from 10% to 90%, preferably from 20% to 80%, more preferably from 30% to 70%, even more preferably from 40% to 60%, in particular about 50% of the OH groups in C6 position of the glycosidic rings of the nanocellulose comprised in the cationic dye according to the invention are substituted with a colored moiety. The proportion of OH groups in C6 position of the glycosidic rings of the nanocellulose comprised in the cationic dye according to the invention that are substituted with a colored moiety may vary in a wide range depending, among others, on the structure and the steric hindrance of the colored moiety.

In some embodiments, the colored moiety is a colored organic moiety. The colored organic moiety may for instance be selected from the group consisting of direct dyes and natural dyes.

In some embodiments, the colored moiety is a colored mineral moiety. The colored mineral moiety may for instance be selected from the group consisting of metal oxides, colored structures formed from one or multiple metals, such as copper, zinc, titanium, vanadium, nickel, gold and/or silver, and any mixtures or composites thereof. In preferred embodiments, the colored mineral moiety is selected from the group consisting of metal oxides. The colored mineral moiety may present different structures, such as a core-shell structure.

Metal oxides may for instance be selected from the group consisting of iron oxide, cobalt oxide, chromium oxide, copper oxide, manganese dioxide, nickel oxide and any mixture or composite thereof.

In some embodiments, the iron oxide is selected from the group consisting of $Fe_3O_4$ (black), $Fe(OH)O$ (yellow) and $Fe_2O_3$ (red) and mixtures thereof. In a preferred embodiment, the iron oxide is $Fe_3O_4$.

In some embodiments, the colored moiety comprises nanostructures, such as nanoparticles or nanocomposites, of a colored mineral moiety. Preferably, the colored moiety comprises or consists of iron oxide nanoparticles, in particular $Fe_3O_4$ nanoparticles.

The colored mineral moiety is preferably crystalline.

In some embodiments, the colored mineral moiety further comprises at least one impurity. Classical impurities to be included in a colored mineral moiety are well-known in the art in view of the chemical structure of the colored mineral moiety and/or of the desired color to be obtained. In some embodiments, the at least one impurity is selected from the group consisting of magnesium, potassium and calcium. In some embodiments, the colored mineral moiety comprises a metal oxide, such as iron oxide, and at least one impurity, preferably selected from the group consisting of magnesium, potassium and calcium.

The at least one impurity may be present in the colored mineral moiety comprising at least one metal oxide, preferably iron oxide, in any suitable amount for obtaining the desired color.

In order to obtain a colored mineral moiety comprising a metal oxide, in particular iron oxide, and at least one impurity, the impurity may be present during the in-situ formation of the colored mineral moiety from a precursor thereof, said precursor being bound to the nanocellulose.

Without wishing to be bound by any theory, the Inventors believe that the impurities fill part or all of the gaps in the crystalline structure of the metal oxide, for instance of iron oxide, thus changing the light reflection through the crystal and triggering a shift in the reflected wavelength.

In some embodiments, the colored moiety bears a positive charge, and is thus a cationic moiety. In such embodiments, the at least one cationic moiety and the at least one colored moiety may be either the same moiety, or different moieties.

In an embodiment, the at least one cationic moiety and the at least one colored moiety are different moieties.

The method according to the invention gives access to cationic dyes wherein the colored moiety is a neutral moiety or a cationic moiety. This was not possible with prior art methods using cationic functionalized nanocellulose for the capture of anionic dyes.

Synthesis

A second object of the invention is a process for the synthesis of a cationic dye according to the invention.

Despite the difficulty of selectively functionalizing the different positions of the glycosidic rings of cellulose, the Inventors of the present invention unexpectedly evidenced that implementing the synthesis process of the invention allows successfully linking both:

a colored organic or mineral moiety only in C6 position of the glycosidic rings of nanocellulose, and a cationic moiety only in C2 and/or C3 positions of the glycosidic rings of nanocellulose.

The steps of the synthesis process according to the invention are suitable for covalently linking the cationic moiety to at least part of the hydroxy groups in C2 and/or C3 position(s) of the glycosidic rings of nanocellulose, and for linking the colored moiety to at least part of the hydroxy groups in C6 position of the glycosidic rings of nanocellulose, preferably through ionic and/or hydrogen bonds.

The synthesis process according to the invention comprises the steps of:

(i) Contacting the optionally modified nanocellulose with a colored moiety, or a precursor thereof, and (ii) Contacting the optionally modified nanocellulose with a cationic moiety, to obtain a cationic dye.

According to this embodiment, step (i) and step (ii) may be implemented in the recited order ((i) and then (ii)), or step (ii) can be implemented before step (i). The two variants here-under illustrate the two possibilities.

According to a first variant, the synthesis process according to the invention comprises the steps of:

(ia) Contacting optionally modified nanocellulose with a colored moiety, or a precursor thereof, to obtain a partially functionalized nanocellulose, and (iia) Contacting the optionally further modified partially functionalized nanocellulose obtained at step (ia) with a cationic moiety, to obtain a cationic dye.

According to another variant, the synthesis process according to the invention comprises the steps of:

(iib) Contacting optionally modified nanocellulose with a cationic moiety to obtain a partially functionalized nanocellulose, and (ib) Contacting the optionally further modified partially functionalized nanocellulose obtained at step (iib) with a colored moiety, or a precursor thereof, to obtain a cationic dye.

Preliminary Step

The synthesis process according to the invention may comprise, before step (i) and before step (ii), at least one preliminary step (0) of cellulose or nanocellulose pretreatment. Said step may for instance comprise enzymatic desizing, cutting, mechanically desizing, and/or swelling the cellulose or nanocellulose. Said step may, in other embodiments, comprise suitably pretreating cellulose to obtain nanocellulose, in particular to obtain cellulose nanofibers, cellulose nanocrystals or any mixture thereof.

Step (i)

Step (i) may be performed by any suitable technique known in the art.

The optional modification of nanocellulose at step (i) may be a modification for creating negatively-charged moieties, such as carboxylate COO or sulfonate $SO_3^-$ moieties, on the nanocellulose. For instance, the optional modification of nanocellulose at step (i) may be a selective transformation of at least part of the primary OH groups in C6 position of nanocellulose into carboxylate or sulfonate moieties, preferably carboxylate moieties. In an embodiment, the transformation is an oxidation of at least part of the primary OH groups in C6 position of nanocellulose into carboxylate moieties.

In some embodiments, the colored moiety, in particular the colored organic or mineral moiety, is linked to nanocellulose at step (i) by reacting the colored moiety with optionally modified nanocellulose, for instance with oxidized nanocellulose comprising carboxylate moieties in C6 positions. For example, organic colorants bearing-OH groups may be reacted with the carboxylate moieties in C6 positions to produce an ester link between the nanocellulose backbone and the colored moiety. Examples of such organic colorants include Alizarine, Haematoxylin, Carminic acid, Luteolin, Curcumin, Disperse Red 60, Acid Orange 7.

In other embodiments, the binding between the colored moiety and the nanocellulose at step (i) may be obtained by reacting a precursor of the colored moiety, for instance a metallic positively-charged ion, such as $Fe^{2+}$, with optionally modified nanocellulose, for instance with oxidized nanocellulose comprising carboxylate moieties in C6 positions, and further in-situ transformation of the precursor into the colored moiety, for instance by contacting the precursor fixed to nanocellulose with a reducing agent. The reducing agent may be, according to a reaction which is well known to the skilled professional, a base, like for example NaOH. The following publications disclose transformation of iron ions into iron oxide nanoparticles: J. Phys. Chem. C 2011, 115, 2, 390 396, Dec. 13, 2010; Journal of Nanoparticle Research volume 14, Article number: 755 (2012), 6 Mar. 2012; Journal of Nanoscience Volume 2017, 7 pages, Article ID 8348507, 3 Jan. 2017.

In other embodiments, binding between the colored moiety and the nanocellulose at step (i) may be obtained by reacting a precursor of the colored moiety, for instance a metallic positively-charged ion, such as $Fe^{2+}$, with nanocellulose and further in-situ transformation of the precursor into the colored moiety, for instance by contacting the precursor fixed to nanocellulose with a reducing agent.

The step of in-situ transformation of the precursor into the colored moiety may be performed at different conditions of temperature, and/or in presence of different impurities, such as calcium, potassium, magnesium or manganese, to modify the chemical structure and/or size of the formed colored moiety, in particular iron oxide.

In some embodiments, especially when the colored moiety is a colored organic moiety, step (i) is performed by contacting non-modified nanocellulose with the colored moiety. In that case, it is preferred to use a colored moiety bearing reactive groups capable of forming a covalent link with the —OH groups in C6 position of nanocellulose. Examples of such organic colorants include direct dyes, reactive dyes, indigo dye . . . .

Step (ii)

Step (ii) may be performed by any suitable technique known in the art.

The further optional modification of partially functionalized, or not partially functionalized, nanocellulose at step (ii) may be a modification for creating reactive sites for the further covalent binding of the cationic moiety. For instance, the optional modification of partially functionalized nanocellulose at step (ii) may be a selective oxidation of the OH groups in C2 and/or C3 positions of nanocellulose into aldehyde moieties. Preferably, modification of nanocellulose at step (ii) consists in the selective oxidation of the OH groups in C2 and/or C3 positions of nanocellulose into aldehyde moieties, even more advantageously the method modification of nanocellulose at step (ii) uses $NaIO_4$ as an oxidizing agent.

In some embodiments, the synthesis process according to the invention comprises the steps of:

a) Contacting nanocellulose with at least one oxidizing agent suitable for selectively oxidizing at least part of the primary OH groups in C6 position of nanocellulose into carboxylate moieties, to obtain a partially oxidized nanocellulose, b) Contacting the partially oxidized nanocellulose obtained at step (a) with a colored moiety as defined above, or a precursor thereof, to obtain a partially functionalized nanocellulose, c) Contacting the partially functionalized nanocellulose obtained at step (b) with at least one oxidizing agent suitable for selectively oxidizing at least part of the OH groups in C2 and/or C3 positions of nanocellulose into aldehyde moieties, to obtain an aldehyde-modified partially functionalized nanocellulose, and d) Contacting the aldehyde-modified partially functionalized nanocellulose obtained at step (d) with a cationic moiety comprising an amine moiety, and optionally a reducing agent, to obtain a cationic dye according to the invention.

Oxidation Step (a)

Oxidation step (a) may be performed by any suitable method known in the art for oxidizing at least part of the primary OH groups in C6 position of nanocellulose into carboxylate moieties. Any suitable oxidizing agent may be used for implementing oxidation step (a). In some embodiments, the oxidizing agent used at step (a) is selected from the group consisting of TEMPO and potassium hydrogenopersulfate (oxone).

Partial Functionalization Step (b)

Partial functionalization step (b) may be performed in any suitable conditions for fixing the colored moiety or the precursor thereof to the partially oxidized nanocellulose. The features and embodiments disclosed above for step (i) apply similarly to partial functionalization step (b).

Further Oxidation Step (c)

Further oxidation step (c) may be performed by any suitable method known in the art for oxidizing at least part of the OH groups in C2 and/or C3 positions of nanocellulose into aldehyde moieties. Any suitable oxidizing agent may be used for implementing further oxidation step (c). In some embodiments, the oxidizing agent used at step (c) is a periodate, such as sodium metaperiodate.

Further Functionalization Step (d)

Further functionalization step (d) may be performed in any suitable conditions for fixing the cationic moiety to the aldehyde-modified partially functionalized nanocellulose. Further functionalization step (d) may be performed by reductive amination, in presence of a cationic moiety comprising an amine moiety, in particular a diamine, and a reducing agent, such as sodium borohydride. The cationic moiety contacted at step (d) with the aldehyde-modified partially functionalized nanocellulose does not necessarily bear a positive charge when both compounds are contacted. In such embodiments, step (d) comprises a further step of submitting the further functionalized nanocellulose to suitable experimental conditions for conferring the cationic moiety at least one positive charge, to obtain a cationic dye according to the invention. Said further step may be for instance the submission of the further functionalized nanocellulose to acidic conditions in order to form a quaternized amine moiety.

In some embodiments, the synthesis process according to the invention comprises the steps of:

a') Contacting nanocellulose with at least one agent suitable for transforming at least part of the primary OH groups in C6 position of nanocellulose into sulfonate moieties, to obtain a partially sulfonated nanocellulose, b') Contacting the partially sulfonated nanocellulose obtained at step (a') with a colored moiety as defined above, or a precursor thereof, to obtain a partially functionalized nanocellulose, c') Contacting the partially functionalized nanocellulose obtained at step (b') with at least one oxidizing agent suitable for selectively oxidizing at least part of the OH groups in C2 and/or C3 positions of nanocellulose into aldehyde moieties, to obtain an aldehyde-modified partially functionalized nanocellulose, and d') Contacting the aldehyde-modified partially functionalized nanocellulose obtained at step (c') with a reducing agent and a cationic moiety comprising an amine moiety, to obtain a cationic dye according to the invention.

Step (a') may be implemented by any suitable technique known in the art. In particular, step (a') may be performed by sulfonic acid hydrolysis of nanocellulose.

Steps (b'), (c') and (d') may be implemented as described above respectively for steps (b), (c) and (d).

In all embodiments relating to the synthesis process according to the invention, the steps may be implemented in the disclosed order. However, said steps may alternatively be implemented in any other order suitable for obtaining the cationic dye according to the invention. In other words, step (i) may for instance be implemented before step (ii) or after step (ii). The same applies to steps (a) to (d), and/or to steps (a') to (d').

For example, the method comprising steps (a) to (d) may be implemented by following the order: (a), then (b), then (c) and finally (d), or it can be implemented by following the order: (c), then (d), then (a) and finally (b), Similarly, the method comprising steps (a') to (d') may be implemented by following the order: (a'), then (b'), then (c') and finally (d'), or it can be implemented by following the order: (c'), then (d'), then (a') and finally (b').

Step (a) and step (a') are optional, thus another sequence of operations may be (b), (c) and (d) or (c), (d) and (b), (b'), (c') and (d') or (c'), (d') and (b').

In the synthesis process of the invention, all references to "nanocellulose" as starting material of a step may also refer to a mixture of nanocellulose and cellulose. Actually, in some embodiments, the first step (i), (a) or (a') of the synthesis process according to the invention is implemented directly on nanocellulose. In other embodiments, nanocellulose is gradually formed during the steps of the synthesis process according to the invention from cellulose, especially during the oxidation steps.

Dyeing Process

A third object of the invention is a process for dyeing at least part of a fiber material, preferably a textile fiber material, using a cationic dye according to the invention, or a cationic dye prepared by a synthesis process according to the invention.

The fiber material may be any material comprising or consisting of fibers, preferably of fibers of a material that is negatively charged or that may be modified to bear at least one negative charge. Preferably, the fibers material surface is negatively charged or may be modified to bear at least one negative charge.

The fiber material may for instance be selected from the group consisting of a yarn, a tissue, a fabric, a knitting, and a cloth.

The fibers of the fiber material may be textile fibers.

The fibers of the fiber material may be natural or synthetic fibers. Among natural fibers may be cited vegetable fibers and animal fibers. Among vegetable fibers may be cited abaca fibers, coco fibers, cotton fibers, flax fibers, hemp fibers, jute fibers, ramie fibers, sisal fibers and viscose fibers. Among animal fibers may be cited alpaca fibers, angora fibers, camel hair fibers, cashmere fibers, mohair fibers, silk fibers and wool fibers. Among synthetic fibers may be cited man-made cellulosic fibers, rayon fibers, viscose fibers, polyester fibers, polyamide fibers and elastane fibers.

The fibers of the fiber material may be selected from the group consisting of cellulosic fibers and non-cellulosic fibers. The cellulosic fibers may be selected from the group consisting of cotton fibers, flax fibers, hemp fibers, rayon fibers, viscose fibers, modal fibers, lyocell fibers and bamboo fibers; preferably they may be cotton fibers. The non-cellulosic fibers may be selected from the group consisting of polyester fibers, nylon fibers and silk fibers; preferably they may be polyester fibers. In a preferred embodiment, the fibers are textile fibers selected from the group consisting of cotton fibers and polyester fibers. In an embodiment, the fibers are cotton fibers.

In some embodiments, the process for dyeing at least part of a fiber material according to the invention comprises the steps of:

a) contacting at least part of the fiber material with a pretreatment agent, so as to obtain a pretreated fiber material, and b) contacting the pretreated fiber material obtained at step a) with at least one cationic dye according to the invention or at least one cationic dye obtained with a synthesis process according to the invention, to obtain a dyed fiber material.

The Inventors of the present invention unexpectedly evidenced that implementing a dyeing process according to the invention allows obtaining a dyed fiber material with a high color fastness, even after washing, while limiting the loss of mechanical properties of the fibers, the amount of wastewater, the toxicity of wastewater, the dyeing time, and/or the energy consumption.

Moreover, an efficient fixation of the dye on the fibers is obtained with the dyeing process of the invention, without needing the use of a salt or of a post-treatment.

In some embodiments, at least 10%, at least 20%, at least 30%, at least 40%, at least 50%, at least 70%, at least 80%, or at least 90% of the fiber material is dyed with the dyeing process according to the invention.

In a preferred embodiment, 100% of the fiber material is dyed with the dyeing process according to the invention. The percentage here preferably refers to a percentage of the surface of the fiber material to which a color is imparted with the dyeing process of the invention.

The pretreatment agent may be any chemical agent suitable for modifying the fiber material, preferably modifying the surface of the fiber material. The modification of the fiber material may be the creation of at least one negative charge on the fiber material, preferably on the fiber material surface.

The pretreatment agent may be selected by one of ordinary skill in the art based on his knowledge and depending on the type of fibers of the fiber material, and/or on the desired modification of the fiber material.

The pretreatment agent may be selected from the group consisting of an oxidant and a hydrolyzing agent.

In some embodiments, the textile fibers of the fiber material comprise or consist of cotton fibers, and the pretreatment agent is an agent suitable for creating at least one negative charge on the cotton fibers surface. The negative charges may be borne by carboxylate $COO^-$ moieties at the surface of cotton fibers.

In such embodiments, the pretreatment agent may be an oxidant. The oxidant may be selected from the group consisting of TEMPO, TEMPO in presence of iron, potassium hydrogenopersulfate (oxone), hydrogen peroxide, hydrogen peroxide in presence of iron, and sodium metabisulfite. Preferably, the oxidant is TEMPO or potassium hydrogenopersulfate (oxone), or hydrogen peroxide in presence of iron salts, preferably TEMPO.

In some embodiments, the textile fibers of the fiber material comprise or consist of polyester fibers, and the pretreatment agent is an agent suitable for creating at least one negative charge on the polyester fibers surface.

In such embodiments, the pretreatment agent may be a hydrolyzing agent. The hydrolyzing agent may be any suitable hydrolyzing agent, such as hydroxides, in particular sodium hydroxide.

The amount of pretreatment agent used at step a) may vary in a wide range depending on the type of pretreatment agent, the type of fiber material, and/or the desired degree of modification of the fibers, in particular the desired degree of negative charge creation of the fibers.

In some embodiments, the pretreatment agent is used in an amount ranging from 0.2% to 200% in weight relative to the weight of fiber material.

In some embodiments, the pretreatment agent is used in an amount ranging from 0.2% to 2% in weight relative to the weight of fiber material. In some embodiments, the pretreatment agent is TEMPO and is used in an amount ranging from 0.2% to 2% in weight relative to the weight of fiber material.

In other embodiments, the pretreatment agent is used in an amount ranging from 5% to 200% in weight relative to the weight of fiber material. In some embodiments, the pretreatment agent is potassium hydrogenopersulfate (oxone) and is used in an amount ranging from 5% to 200% in weight relative to the weight of fiber material. In some embodiments, the retreatment agent is potassium hydrogenopersulfate (oxone) and is used in an amount ranging from 0.01 to 2.5 molar equivalents of fiber material.

Pretreatment step a) may be performed in any suitable experimental conditions, such as temperature, duration, solvent nature and/or amount of the different reagents, in particular sodium hydroxide concentration, for obtaining the suitably modified fiber material, also referred to as pretreated fiber material. Preferably, said experimental conditions allow preventing breaking the fibers.

In some embodiments, pretreatment step a) is performed at a temperature ranging from 20° C. to 80° C., preferably at a temperature of about 50° C. Such temperature is especially suitable when the pretreatment agent is TEMPO or potassium hydrogenopersulfate (oxone).

In some embodiments, pretreatment step a) is performed for a duration ranging from 30 minutes to 6 hours, preferably for a duration of about 1 hour. Such duration is especially suitable when the pretreatment agent is TEMPO or potassium hydrogenopersulfate (oxone).

The specific conditions used for the pretreatment step a) of the dyeing process according to the invention allow the creation of negative charges at the surface of the fibers, preferably of the textile fibers.

In some embodiments, in particular when the pretreatment agent used at pretreatment step a) is potassium hydrogenopersulfate (oxone), the dyeing process further comprises, between pretreatment step a) and dyeing step b), a step a') of rinsing of the pretreated fiber material with a rinsing solution. Preferably, the rinsing solution is water or an alkali solution. Rinsing step a') contributes to eliminating excess pretreatment agent, especially excess potassium hydrogenopersulfate (oxone), and avoiding said excess pretreatment agent reacts with the dye and/or alters homogeneity of the coloration.

Dyeing step b) may be performed in any suitable experimental conditions, such as temperature, duration, solvent nature and/or amount of the different reagents, for obtaining the suitably dyed fiber material.

In some embodiments, dyeing step b) is performed at a temperature ranging from room temperature (20° C.) to 50° C. The invention has the advantage, compared with prior dyeing methods, that it can be implemented at a low temperature while providing high quality dyeing, among others a satisfying color intensity and high fastness.

In some embodiments, dyeing step b) is performed for a duration ranging from 15 min to 60 min.

The dyeing process according to the invention may further comprise at least one drying step c). Drying step c) may be performed between pretreatment step a) and dyeing step b), and/or after dyeing step b).

Preferably, drying step(s) c) is (are) implemented at a temperature lower than 120° C., preferably lower than 60° C., more preferably lower than 30° C. In a preferred embodiment, drying step(s) c) is (are) performed at room temperature, from 15° C. to 30° C.

Precursor of the Cationic Dye

A fourth object of the invention is a precursor of the cationic dye of the invention, comprising:
 nanocellulose,
 at least one moiety susceptible to be converted to a cationic moiety, covalently linked to the nanocellulose, and
 at least one colored moiety linked to the nanocellulose.

The precursor of the cationic dye of the invention may be transformed into a cationic dye according to the invention by addition of at least one positive charge. For instance, if the precursor of the cationic dye of the invention comprises an amine moiety, it may be transformed into a cationic dye according to the invention by quaternization of the amine, for instance by submitting the precursor to acidic conditions.

Alternately an amine moiety comprising a cationic group may be directly incorporated in the cationic dye, like for example Girard's reagent's T.

All embodiments disclosed above regarding the cationic dye of the invention and/or the synthesis process thereof apply mutatis mutandis to the precursor of the cationic dye according to the invention.

Use and Dyed Fiber Material

A fifth object of the invention is the use of a cationic dye according to the invention or of a cationic dye prepared by a synthesis process according to the invention in a dyeing process, especially in a dyeing process of at least part of a fiber material, such as a textile fiber material.

A sixth object of the invention is a dyed fiber material with a cationic dye according to the invention or with a cationic dye obtained by a synthesis process according to the invention. The dyed fiber material according to the invention may be obtained by a dyeing process according to the invention.

FIGURES

EXAMPLES

Figure 1:
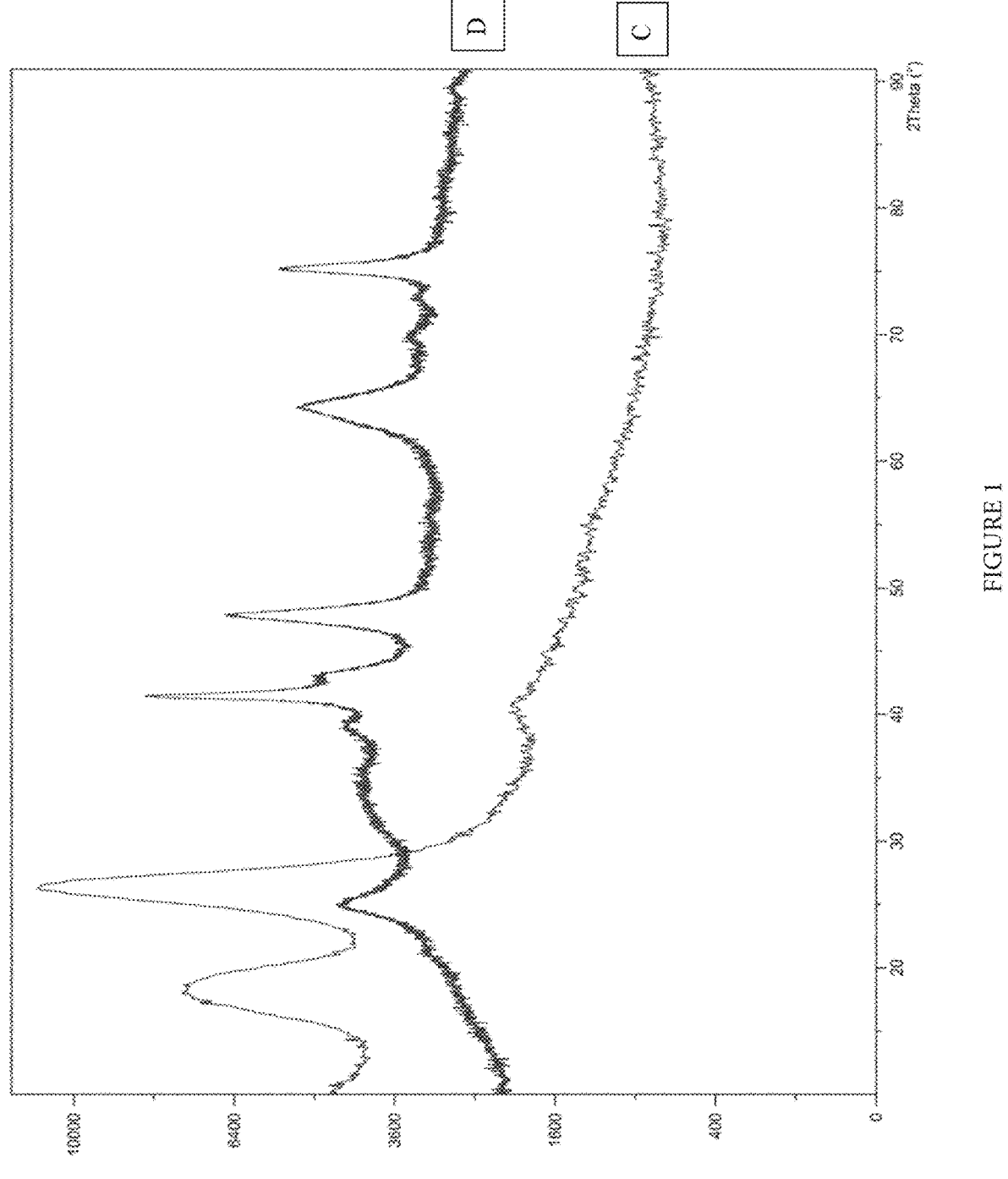
FIG. 1 is a graph representing the XRD analysis of the cationic dye of example 3—the intensity in arbitrary units is represented in ordinate and the 2 theta angle is represented in abscissa. D designates the spectra of the iron oxide dye and C designates the spectra of cellulose.

The present invention is further illustrated by the following examples.

Example 1: Synthesis of a Dye According to the Invention

Materials

The following materials were used for implementing the synthesis of a cationic dye according to the invention:
 Cellulose paste sheets (24 cm×18 cm): halbstoff-zelluse-blatt 19164,
 Sodium hydroxide 98+% Thermo scientific,
 NaClO$_2$ laboratorium discounter 99%,
 NaClO 7.5%-Gaches Chimie SAS,
 1,4 butadiamine 99% Sigma Aldrich,
 TEMPO 2,2,6,6-Tetramethyl-1-piperidinyloxy, free radical, 98+%: Alfa Aesar,
 Oxone, monopersulfate: Alfa Aesar,
 Iron (III) nitrate nonahydrate: Fisher Chemical,
 Sodium metaperiodate: Thermo scientific,
 Sodium borohydride 99+%: Fischer Chemical,
 HCl ~37%: Fischer Chemical,
 Iron (II) Sulfate heptahydrate 99.5% Thermo scientific
 Iron (III) Sulfate pentahydrate Thermo scientific
 Manganese (II) Sulfate monohydrate 99% Thermo scientific
 Arbocel Microfibrillated cellulose
 Isopropanol Thermo scientific
 Girard's Reagent T 99% Thermo scientific
 Ethanol Dénaturé 70%, MN France

Methods

The present process was implemented with using cellulose as starting material. Cellulose was gradually transformed into nanocellulose during the different steps A to E, especially during oxidation steps.

XRD was implemented on an Aeris Benchtop XRD Malvern Panalytical device.

A) Swelling of Cellulose

A piece of cellulose sheets (1-10 g dry weight) was cut grossly with scissors and mechanical desizing was performed with a kitchen blender for 10 min. The obtained material was dispersed in a 100-500 mL NaOH solution (0.5 to 2.0 mol/L) by mechanical or magnetic stirring (300-800 rpm) at 50-80° C. After 2 hours, the dispersion was filtered and/or washed with deionized water (1-5 L) by centrifugation (1000 to 3600 RCF (relative centrifugal force)—2 to 5 min at room temperature). The swelled cellulose was stored at room temperature with solid consistency of 9.8 wt %.

B1) Oxone Oxidation

The oxidation of swelled cellulose was performed using Oxone (potassium hydrogenopersulfate). Briefly, 1.0 g to 15.0 g of swelled cellulose (dry weight) was dispersed in 50 to 500 mL of deionized water by 500 rpm at 30 to 60° C. Next, 1 to 50 mL of oxone solution (1 to 5 eq., to the mass of cellulose) was added. The reaction was followed by 1 to 5 hours. Then, the oxidized cellulose was filtered and/or washed with deionized water (1-5 L) by centrifugation (1000 to 3600 RCF-2 to 5 min at room temperature). The oxidized cellulose was stored at room temperature with solid consistency of 8.0 wt %.

B2) TEMPO Oxidation

Alternatively to oxone oxidation, TEMPO was also used for oxidating nanocellulose.

1.0 to 15.0 g of swelled cellulose (dry weight) was dispersed in 50 to 500 mL of phosphoric buffer (pH 4.5) by 500 rpm at 50-80 C. Next, 0.04 g of TEMPO was added. After complete solubilization of TEMPO (1-3 min), the reaction was started by adding 20 mL of an aqueous solution containing 2.4 g of $NaClO_2$ and 16 mL of NaClO. The reaction was followed for 2-8 hours. Then, the reaction was stopped by the addition of ethanol 70% (2 eq. to TEMPO) and was filtered or washed with deionized water (1-5 L) by centrifugation (1000 to 3600 RCF-2 to 5 min at RT). The oxidized cellulose was stored at room temperature with solid consistency of 8.0 wt %

C) Iron Incorporation 0.1 to 2.0 g of oxidized cellulose (dry weight) was dispersed in 25 to 100 mL of deionized water by 500 rpm at room temperature for 5 min. Then, 10 mL of aqueous solution containing $Fe_2SO_4 \cdot 7H_2O$ (0.01 to 0.1 eq) and $Fe_2(SO_4)_3$ (0.01 to 0.1 eq) was added. After 5 min, 5 mL of NaOH (0.1 to 1 mol/L) were added dropwise or rapidly and allowed to be stirred at room temperature for more than 5 min. Then, the dispersion was filtered or washed with deionized water (1-5 L) by centrifugation (1000 to 3600 RCF-2 to 5 min at RT). The oxidized cellulose was stored at room temperature with solid consistency of 8.0 wt %. The reducing agent was added in the final step to prevent iron oxide aging. NaOH treatment transforms the iron salts into iron oxide as is well known by the skilled professional. The presence of iron oxide particles is confirmed by XRPD.

D) Periodate Oxidation 0.1 to 2.0 g of oxidized cellulose resulting from step B1, or from step B2 or from step C, containing or not iron, was dispersed in 25 to 100 mL of deionized water or acetate buffer (pH 3.5) by 500 rpm at 35 to 80° C. for 5 min. The flask was protected from the light using aluminum foils, and 0.5 to 4 eq. of meta periodate sodium was added. The reaction was followed for 1-6 hours. Then, the dispersion was filtered or washed with deionized water (1-5 L) by centrifugation (1000 to 3600 RCF-2 to 5 min at RT). The oxidized cellulose was stored at room temperature with solid consistency of 8.0 wt %

E) Reductive Amination 0.1 to 2.0 g of periodate oxidated cellulose (containing or not iron) resulting from step D, was dispersed in 25 to 100 mL of acetate buffer (pH 4.5) or deionized water (pH 4.5 corrected with HCl solution) by 500 rpm at 50 C for 5 min. Then, 1 to 75 eq. (to aldehydes molar) of 1,4 butadiamine was added to the solution. The reaction was followed for 5-6 hours. Then, the temperature was lowered to 25° C. and was added, dropwise, 10 mL of NaBH4 solution of 2 to 10 eq. (to cellulose aldehydes molar) Furthermore, it was allowed to reductive treatment for 1 to 3 hours. The dispersion was filtered or washed with deionized water (1-5 L) by centrifugation (1000 to 3600 RCF-2 to 5 min at RT). The aminated cellulose (containing or not iron) was stored at room temperature with solid consistency of 8.0 wt %.

Example 2: Process for Dyeing at Least Part of a Textile Fiber Material According to the Invention: Model with Simple Cations In order to demonstrate the advantages of the process according to the invention, the dyeing process was implemented with replacement of the specific cationic dye of the invention with model metallic cations, $Fe^{2+}$ and $Cu^{2+}$. The use of the cationic dye according to the invention would allow at least as good results to be obtained, and a better color fastness is expected compared to that obtained with model metallic cations.

a) Pretreatment with TEMPO

In 200 mL of sodium phosphate buffer solution (pH around 3.5), 1 eq of TEMPO was added with 50 to 250 eq of $NaClO_2$ and 0 to 50 eq of NaClO. The mixture was stirred for few minutes until the dissolution of TEMPO. Then 5 g of cotton fabric or yarn was immersed in the oxidation solution under stirring for 1-8 hours at room temperature to 80° C. After a certain the amount of time, the yarns or fabric were removed and washed twice with deionized water.

b) Dyeing with $Fe^{2+}$ and $Cu^{2+}$ 0.5 g of yarn or 4×4 squared samples of the oxidized cotton fabrics were soaked in a 10 mL 10-3 M aqueous solution of $CuSO_4$ or $FeSO_4$ for 10-30 min. The fabrics were removed from the metal salt solutions, then rinsed with water to remove the excess of ions, then doped in alkaline solution (pH=10). Finally, the sample was rinsed with deionized water and dried in an oven at 70° C. or in air.

c) Results of Fastness Tests

Fastness tests were performed on the treated fabrics obtained after pretreatment with TEMPO and dyeing with $Fe^{2+}$ or $Cu^{2+}$.

The tests were the following:

Breaking strength and elongation at break of individual wires according to NF EN ISO 2062:2010

Color fastness to domestic and industrial washing according to NF EN ISO 105 C06: 2010

Color fastness to artificial light: xenon arc lamp according to NF EN ISO 105 B02: 2014

Color fastness to sweat according to NF EN ISO 105 E04: 2013

Color fastness to rubbing according to NF EN ISO 105 X12: 2016.

Table 1 below presents the results of the fastness tests.

TABLE 1

| Results of fastness tests | | |
| --- | --- | --- |
| Light | | 4-5/5 |
| Washing | degradation | 3/5 |
| | disgorgement | 5/5 |
| Rubbing | dry | 5/5 |
| | wet | 4-5/5 |
| Perspiration | alkaline | 3-4/5 |
| | acid | 2-3/5 | d) Process with a Potassium Hydrogenopersulfate Pretreatment

The same process was implemented, wherein the TEMPO oxidation step a) was replaced with a potassium hydrogenopersulfate (oxone) oxidation, according to the conditions below. Potassium hydrogenopersulfate is cheaper than TEMPO, and avoids the use of toxic chlorine compounds.

0.1-2.5 eq of Oxone was dissolved in deionized water. After obtaining a clear solution, 1 eq of cotton fabrics was added to the flask and stirred at 25-50° C. for 0.5-2 hr. When oxidation was completed, the fabrics were removed and rinsed several times with deionized water, and if required, with sodium hydroxide solution to removed excess Oxone. The fabrics were then dried overnight or in the oven for couple of hours to yield white oxidized cotton fabrics.

The dyeing process was performed in the same conditions as described in (b).

Similar results were obtained to those obtained with the TEMPO oxidation pretreatment.

Example 3: Process for Synthesizing an Orange Cationic Dye According to the Invention Gel suspensions containing 10 g (dry mass) of sample cellulose nanofibers produced using TEMPO oxidation (according to example 1-B2) was added to 1.0 L glass bottle.

The volume was adjusted to 800 mL with deionized water under magnetic stirring at 720 RPM.

After 30 min, 50 mL containing 10 g of $FeSO_4·7H_2O$ was added and allowed to stir for 30 min.

20 g of NaOH was solubilized in 50 mL of deionized water and allowed to cool down to room temperature.

The NaOH solution was added to the cellulose suspension and allowed to stir for 30 min. The rotation was adjusted to 740 RPM.

The suspension was then transferred to 50 mL plastic centrifuge tubes.

The formed suspension was washed with deionized water through 6 cycles of centrifugation (3220 RCF-10 min). After addition of deionized water between the cycles, the solids were homogenized using Ultraturax IKA T18 Basic for 1 min at max rotation before a new cycle.

The solids were then suspended in 900 mL of deionized water and allowed to redisperse on a magnetic stirring plate for 24 hours.

The pH of the suspensions was adjusted to pH 3.5 by using an HCl solution (~1.0 mol $L^{-1}$)

The glass flask was then completely covered by aluminum foil to protect the suspension from the light.

30 g of $NaIO_4$ were added and the pH of the suspension was adjusted to 3.5 by using HCl solution (~1.0 mol/L) and NaOH solution (~1.0 mol/L).

The glass flask was then transferred to a water bath at 45° C. coupled to a magnetic stirring plate with real time-controlled temperature.

The suspension was allowed to react for 3 h in these conditions (600 RPM, 45° C.)

The glass flask was then transferred to a water bath at room temperature to cool down the suspensions. and after 5 min, 10 mL of Ethylene Glycol (99%) was added to the suspension to quench the reaction. The aluminum foils were removed.

The solids were washed with deionized water (800 mL each cycle) through 6 cycles of centrifugation (3220 RCF-10 min). After addition of deionized water between the cycles, the solids were homogenized using Ultraturax IKA T18 Basic for 1 min at max rotation before a new cycle.

The precipitated gel was then transferred to a 1.0 glass flask, and 600 mL of deionized water was added. The glass was then placed on a magnetic stirring plate (rotation was adjusted to 500 RPM, 3 cm magnetic stir bar) to redisperse for 30 min.

Then 127 g of Girard Reagent's T was solubilized in 250 mL of deionized water.

Girard's solution was then added to the cellulose suspension by constant stirring. The pH of the resulting dispersion was adjusted to 3.5 using an HCl solution (~1 mol/L) The glass was then transferred to a water bath at 55° C. coupled to a magnetic stirring plate and the magnetic stirring was adjusted to 1000 RPM with real time control of temperature for 4 h and 20 min The glass was then transferred to a water bath at room temperature to cool down the suspension.

A solution containing 10 g of NaBH4 solubilized in 100 mL of KOH solution (0.01 mol/L) was added slowly and then allowed to react for 60 min.

The suspension was washed with deionized water through 6 cycles of centrifugation, then the solids were homogenized using Ultraturax IKA T18 Basic for 1 min at max rotation before a new cycle.

The resulting material was submitted to XRD analysis which confirmed the presence of iron oxide particles (FIG. 1).

Example 4: Process for Synthesizing a Black Cationic Dye According to the Invention Gel suspensions containing 10 g (dry mass) of sample cellulose nanofibers produced using TEMPO oxidation (according to example 1-B2) was added to 1.0 L glass bottle.

Reaction 1: Oxidation by $NaIO_4$:

Cellulose (1 g) was dispersed in 40 mL of demineralized water and homogenized by magnetic stirring at 500 rpm for 30 min. The vial was protected from light with a double layer of aluminum foil. 0.8 g of $NaIO_4$ was added. The pH was adjusted to 3.5 with dilute HCl. The flask was heated at 45° C. in a water bath. The reaction medium was left to react for 3 hours, by constant magnetic stirring at 500 RPM. The vial was transferred to an ambient temperature water bath for 5 min to allow it to cool then 2 mL of isopropanol was added to stop the reaction. The suspension was transferred to 50 mL centrifuge tubes and the volume was adjusted to 50 mL with deionized water. The suspension was centrifuged at 3200 RCF for 10 min. The wash water was discarded and the material was rinsed with demineralised water. The centrifugation and rinsing operations were repeated until the pH reaches 7 and the conductivity no longer varies. The obtained gel is saved for the next reaction.

Reaction 2: Cationisation with Girard's Reactive T

The gel from the previous reaction (1 g) was dispersed in 40 mL of demineralized water and homogenized by magnetic stirring at 500 rpm for 30 min. 0.7 g of Girard's Reagent was added and homogenized by magnetic stirring at 500 rpm for 30 min. pH was adjusted to 3.5 with dilute HCl. The flask was heated in a water bath at 50° C. and left to react for 5 hours. The vial was transferred to a room temperature water bath for 5 min to allow it to cool. The suspension was transferred to 50 mL centrifuge tubes and made up to 50 mL with deionized water. The suspension was centrifuged at 3200 RCF for 10 min. The wash water was discarded and the material was rinsed with 70% ethanol. The material was centrifuged again at 3200 RCF for 10 min and the wash water was discarded, then the material was rinsed with demineralised water. The centrifugation and rinsing operations were repeated until the pH reaches 7 and the conductivity no longer varies. The gel was saved for the next reaction.

Reaction 3: Introduction of the Colored Moiety:

The gel from the previous reaction (1 g) was dispersed in 40 mL of demineralized water and homogenized by magnetic stirring at 500 rpm for 30 min under nitrogen bubbling. A solution of 0.533 g of iron II sulphate heptahydrate, 1.175 g of iron III sulphate pentahydrate and 0.081 g of Manganese II sulphate monohydrate in 10 mL of demineralised water previously placed for 10 min under nitrogen bubbling was added and the reaction medium was homogenized by magnetic stirring at 500 rpm for 30 min under nitrogen bubbling. A solution of 2 g of NaOH in 10 mL of demineralised water previously placed for 10 min under nitrogen bubbling was added. The reaction medium was left to react for 30 min under bubbling nitrogen. The suspension was transferred to 50 mL centrifuge tubes and made up to 50 mL with deionized water. The material was centrifuged at 3200 RCF for 10 min and the wash water was discarded, the material was rinsed with demineralised water. The centrifugation and rinsing operations were repeated until the pH reaches 7 and the conductivity no longer varies.

Figure 2:
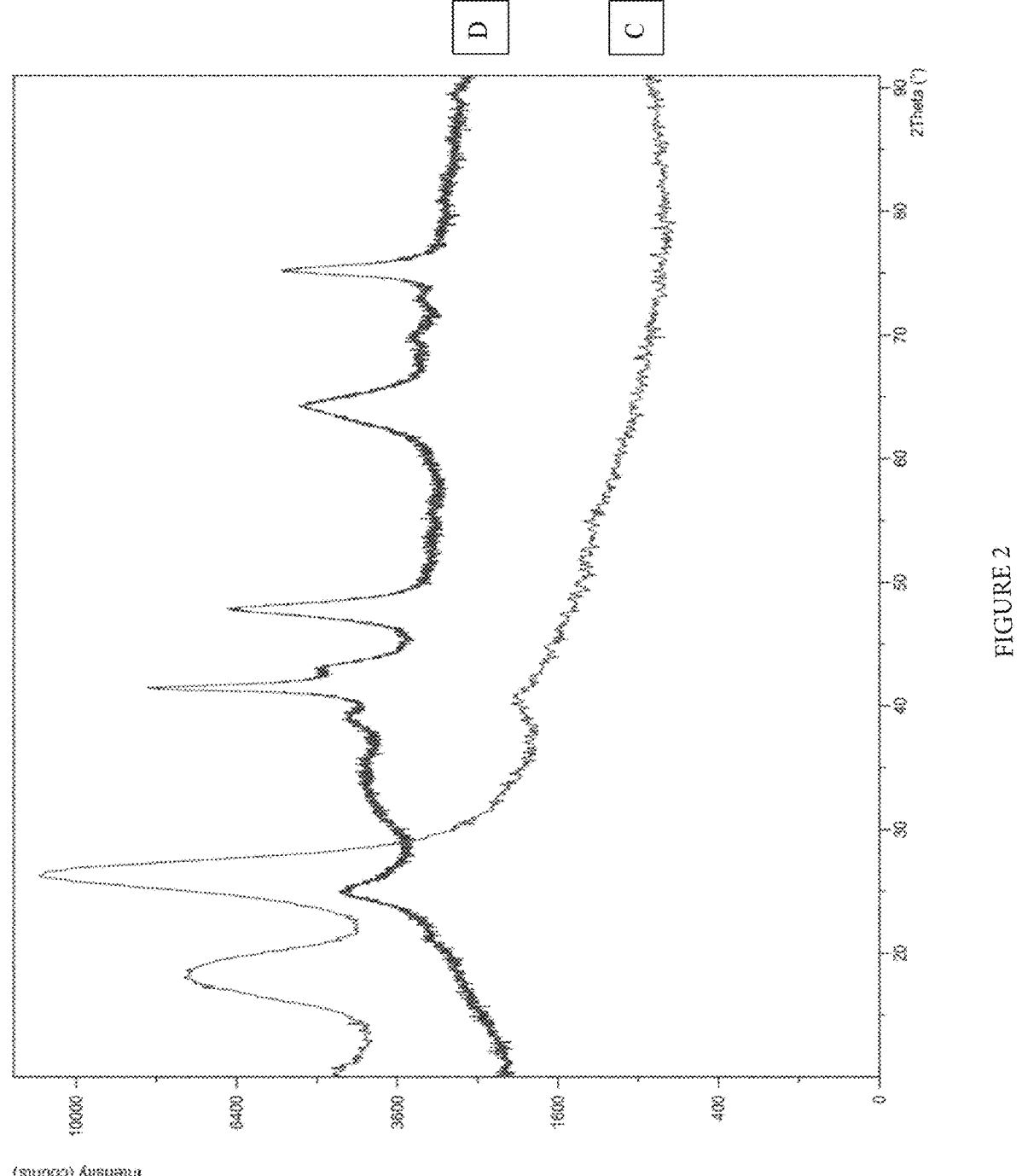
FIG. 2 is a graph representing the XRD analysis of the cationic dye of example 4—the intensity in arbitrary units is represented in ordinate and the 2 theta angle is represented in abscissa. D designates the spectra of the iron oxide dye and C designates the spectra of cellulose.

The resulting material was submitted to XRD analysis which confirmed the presence of iron oxide particles (FIG. 2).

Example 5: Process for Preparing a Colored Dye According to the Prior Art 1 g (dry mass) of tempo oxidized nanofibrillated cellulose was added to 100 mL glass bottle. The volume was adjusted to 80 mL with deionized water. A magnetic stirring bar of 3 cm was added to the flask. The flask was then placed on a magnetic stirring plate, and the rotation was adjusted to 720 RPM.

After 30 min, 5 mL containing 1 g of $FeSO_4 \cdot 7H_2O$ was added and allowed to stir for 30 min.

2 g of NaOH was solubilized in 5 mL of deionized water and allowed to cool down to room temperature. The NaOH solution was added to the cellulose suspension and allowed to stir for 30 min. The rotation was adjusted to 500 RPM.

The suspension was then transferred to 50 mL plastic centrifuge tubes.

The cellulose was washed with deionized water (80 mL each cycle) through 6 cycles of centrifugation (3220 RCF-10 min). After addition of deionized water between the cycles, the solids were homogenized using Ultraturax IKA T18 Basic for 1 min at max rotation before a new cycle.

The solids were then suspended in 500 mL of deionized water and allowed to redisperse on a magnetic stirring plate (500 RPM, using a magnetic stirring bar of 3 cm).

Example 6: Process for Dyeing at Least Part of a Textile Fiber Material

In order to demonstrate the advantages of the process according to the invention, the dyeing process was imple-mented with the specific cationic dye of the invention (Example 3). The fabric was pretreated with hydrogen peroxide and iron sulfate: 130 mL of hydrogen peroxide at 30% concentration, 0.02 g of iron (II) sulfate ($FeSO_4 \cdot 7H_2O$), and 10 ml of water were mixed and added to 20 g of fabric in a pot. The pot was heated to 50° C. for 60 minutes in a lab dyeing machine.

After the 60 minutes, the fabric was rinsed until no residue of hydrogen peroxide was left on it. The pretreated fabric was then added to a pot along with 140 mL of the dyestuff according to example 3 or according to comparative example 5.

The pot was run at room temperature for 30 minutes in the lab dyeing machine. After 30 minutes, the fabric was taken out of the pot, rinsed twice with 140 ml of water in the lab dyeing machine for 10 minutes then left to air dry.

According to a variant, the dyeing material of example 5 was used in combination with a treatment by polyethylene-imine (PEI) (designated 5 PEI)

Pre-Treatment with PEI:

10 g of fabric were pretreated using polyethylenimine (PEI). 70 ml of dye bath containing 2.5 mg/mL of PEI were added to the fabric in a pot. The pot was run in the lab dyeing machine for 10 minutes at room temperature. After the 10 minutes, 2 rinses of three minutes each using 70 ml of deionized water were done. Excess water was removed from the fabric. 70 ml of dyestuff (made using non-cationized cellulose) were added to a pot along with the pretreated fabric. The pot was run at room temperature for 30 minutes in the lab dyeing machine. After 30 minutes, the fabric was taken out of the pot and left to air dry.

Fastness Tests were Performed on the Treated Fabrics

Table 2 below presents the results of the coloration and the fastness tests.

TABLE 2

| Results of coloration and fastness tests | | | | |
|---|---|---|---|---|
| Example No | | 3 | 5 | 5 PEI |
| Coloration | | A | D | D |
| Fastness | | | | |
| Washing | degradation | 4 | 2-3 | 2-3 |
| | disgorgement | 4-5 | 4-5 | 5 |
| Rubbing | dry | 4 | 4-5 | 4-5 |
| | wet | 2 | 4 | 3-4 |

Coloration was characterized by the following scale: A=very intense coloration; B=intense coloration; C=average level coloration; D=slight coloration; E=almost no color-ation. Color change in fastness tests was characterized by the following scale: 5=no color change; 4=slight color change; 3=average level color change; 2=intense color change; 1=very intense color change.

Non cationic dyes of the prior art show good resistance to the disgorgement and the dry rubbing test only because the initial color intensity is very low. These tests demonstrate the improvement provided by the dyes according to the invention in comparison with the non cationic dyes of the prior art, used alone or combined with a PEI pre-treatment.

The invention claimed is:

1. A cationic dye comprising:
nanocellulose,
at least one cationic moiety covalently linked to the nanocellulose, and
at least one colored moiety linked to the nanocellulose, wherein the colored moiety is iron oxide.

2. The cationic dye according to claim 1, wherein the cationic moiety is covalently linked to nanocellulose in C2 or C3 position(s) of at least one glucose moiety of said nanocellulose.

3. The cationic dye according to claim 1, wherein the colored moiety is linked with ionic or hydrogen bonds to nanocellulose in C6 position of at least one glucose moiety of said nanocellulose.

4. The cationic dye according to claim 1, wherein the nanocellulose is selected from the group consisting of cellulose nanofibers, cellulose nanocrystals, and any mixture thereof.

5. The cationic dye according to claim 1, wherein the at least one cationic moiety comprises a quaternized amine group.

6. The cationic dye according to claim 5, wherein the at least one cationic moiety is selected from the group consisting of a quaternized diamine moiety, a quaternized amino acid, a quaternized peptide and a quaternized protein.

7. The cationic dye according to claim 1, wherein the at least one cationic moiety and the at least one colored moiety are different moieties.

8. A process for the synthesis of the cationic dye according to claim 1, comprising the following steps:

(i) Contacting nanocellulose with a colored moiety, or a precursor thereof, and (ii) Contacting nanocellulose with a cationic moiety, to obtain a cationic dye.

9. A process for dyeing at least part of a fiber material, comprising the steps of:

a) contacting at least part of the fiber material with a pretreatment agent, selected from the group consisting of an oxidant and a hydrolyzing agent, so as to obtain a pretreated fiber material, and b) contacting the pretreated fiber material obtained at step a) with at least one cationic dye according to claim 1, to obtain a dyed fiber material.

10. The process for dyeing at least part of a fiber material according to claim 9, wherein the fiber material is a textile fiber material.

11. The process for dyeing at least part of a fiber material according to claim 10, wherein the textile fiber material is selected from the group consisting of a cotton fiber material, a polyester fiber material, a keratinic fiber material and a mixture thereof.

12. The process for dyeing at least part of a fiber material according to claim 9, wherein the oxidant is selected from the group consisting of ((2,2,6,6-tetramethylpiperidin-1-yl) oxy) (TEMPO), ((2,2,6,6-tetramethylpiperidin-1-yl)oxy) (TEMPO), in presence of iron, potassium hydrogenopersulfate, hydrogen peroxide, hydrogen peroxide in presence of iron, and sodium metabisulfite.

13. The process for dyeing at least part of a fiber material according to claim 9, wherein dyeing step b) is performed at a temperature ranging from 20° C. to 50° C.

14. The process for dyeing at least part of a fiber material according to claim 9, wherein the process further comprises, after step b), a step of:

c) drying the dyed fiber material obtained at step b) at a temperature lower than 100° C.

15. The cationic dye according to claim 1, wherein the nanocellulose is cellulose nanocrystals.

16. The cationic dye according to claim 1, wherein the at least one cationic moiety comprises a quaternized primary amine group.

* * * * *